United States Patent [19]
Van Dine et al.

[11] Patent Number: 5,404,244
[45] Date of Patent: Apr. 4, 1995

[54] ELECTROCHROMIC STRUCTURES AND METHODS

[75] Inventors: John E. Van Dine, Mahwah; V. D. Parkhe, Edison; Lisa C. Klein, New Brunswick; Forrest A. Trumbore, Summit, all of N.J.

[73] Assignee: Sun Active Glass Electrochromics, Inc., Valley Cottage, N.Y.

[21] Appl. No.: 866,606

[22] Filed: Apr. 10, 1992

[51] Int. Cl.$^6$ .............................................. G02F 1/153
[52] U.S. Cl. ................................... 359/270; 359/265; 359/269; 359/275
[58] Field of Search ................. 359/265, 269, 270, 275

[56] References Cited

U.S. PATENT DOCUMENTS

| | | | |
|---|---|---|---|
| 4,060,311 | 11/1977 | Green | 359/267 |
| 4,256,379 | 3/1981 | Green | 359/265 |
| 4,573,768 | 3/1986 | Polak et al. | 359/270 |
| 4,824,222 | 4/1989 | Green | 359/275 |
| 4,828,369 | 5/1989 | Hotomi | 359/265 |
| 4,867,541 | 9/1989 | Hotomi | 359/265 |
| 4,876,628 | 10/1989 | Goldner et al. | 361/313 |
| 4,902,110 | 2/1990 | Green | 359/275 |
| 4,938,571 | 7/1990 | Cogan et al. | 359/275 |
| 4,960,324 | 10/1990 | Brown | 359/265 |
| 4,966,083 | 2/1991 | Moser et al. | 427/108 |
| 4,993,810 | 2/1991 | Demiryont | 359/265 |
| 5,016,991 | 5/1991 | Mason | 359/265 |
| 5,019,420 | 5/1991 | Rauh | 427/126.3 |
| 5,028,124 | 7/1991 | Akhtar | 359/265 |
| 5,130,842 | 7/1992 | Gauthier et al. | 359/265 |
| 5,133,594 | 7/1992 | Haas et al. | 359/275 |
| 5,138,013 | 8/1992 | Mason | 528/27 |
| 5,332,530 | 7/1994 | Eid et al. | 359/265 |

*Primary Examiner*—Georgia Y. Epps
*Assistant Examiner*—Evelyn A. Lester
*Attorney, Agent, or Firm*—Lerner, David, Littenberg, Krumholz & Mentlik

[57] ABSTRACT

The invention provides for the simplified production of chromogenic devices, including relatively large scale devices in panel form. One or more of the layers of the invention are formed from heated, hydrolyzed gel reaction product of one or more dissolved organo-inorganics, such as alkoxides, which may be metallic. The invention includes an ion-conducting layer which comprises a lithium based ceramic material containing residual organic impurities.

23 Claims, 2 Drawing Sheets

ELECTROCHROMIC STRUCTURES AND METHODS

BACKGROUND OF THE INVENTION

This invention relates to the creation of electrochromic structures through which energy, including light, can be transmitted under controlled conditions, and more particularly, to electrochromic structures for the controlled energy transmission.

A wide variety of chromogenic structures are available for controlling the through-passage of energy. Such devices operate "chromatically" by producing a change in coloration in accordance with an applied stimulus or excitation.

Thus, a thermochromic device produces a color change in response to temperature. The resultant coloration of, for example, a sheet of material, depends upon the temperature to which the sheet is subjected. There is, however, the objection that a user has only limited control over the coloration since it is temperature dependent.

Another chromogenic device is "photochromic" in that its coloration depends upon the intensity of light that falls upon the device. When glass or other transparent materials are doped with silver halide, a light-induced reaction produces increased darkening with increased intensity of light. Here again, the degree of coloration is dependent upon external effects.

Still another chromogenic device depends upon the extent to which an electrical stimulus is applied and thus is termed "electrochromic". In such devices the nature and extent of coloration depends upon an electrical effect.

Unfortunately, it has been difficult to produce economically electrochromic devices with useful properties, particularly large-scale devices. Consequently, it has been difficult to produce panels with surfaces of the kind needed for architectural windows, skylights and other transparent substrate based products. It also has been difficult to produce economically electrochromic sun glasses, goggles and automotive products.

Accordingly, it is an object of the invention to facilitate the manufacture and use of chromogenic structures. A related object is to facilitate large scale chromogenic applications in which appreciable surface areas are required.

Still another object of the invention is to adapt chromogenic devices to light transmissive structures such as skylights and other arrangements that are intended to provide control over natural illumination over relatively large areas.

A further object of the invention is to facilitate the manufacture and use of electrochromic structures, particularly for relatively large scale applications.

SUMMARY OF THE INVENTION

In accomplishing the foregoing and related objects, the invention provides for the simplified production of chromogenic devices, including relatively large-scale devices in panel form. One or more layers of the chromogenic panel are formed from a heated, hydrolyzed gel reaction product of one or more dissolved organo-inorganics, such as alkoxides, which may be metallic. The term "organo-inorganic" refers to compounds with both organic and inorganic constituents. Alternatively, the hydrolyzed gel may be of one or more metallic compounds. The resulting materials can be adhered to a relatively large-area substrate, which desirably is transparent.

The invention generally provides fast ion conductors and their methods of synthesis. "Fast" ion conductors allow easy throughpassage of ions. Sol-gel prepared lithium silicates have been found to be particularly desirable solid electrolytes for electrochromic devices. The surprisingly fast ion conduction achieved by sol-gel derived materials is speculated to be the result of the open nature of sol-gel derived materials, and the presence of interconnected nanoscale porosity. Not only have such non-porous gels been found to have high ionic mobilities, they also have high degrees of ion concentration. In addition the sol-gels of the invention are produced at relatively low temperatures and can be directly deposited on structures, such as windows, as thin films.

Also, surprisingly, the presence of residual impurities, such as hydrogen and carbon, in sol-gel derived materials does not degrade their chomogenic performance.

In accordance with one aspect of the invention provision is made for energizing the electrochromic panels in order to control their translucency.

In accordance with another aspect of the invention each panel can include successive layers, beginning with a layer of transparent conductive material. This is followed by sequential layers of an electrochromic electrode, an ion conductor, a counterelectrode and a transparent conductor. Other barrier and/or encapsulation layers may be present. One or more of these layers can be a hydrolyzed gel reaction product. In particular, the ion conducting and/or counterelectrode layers are formed from a gel reaction.

The electrochromic and/or complementary counterelectrode layers change color when subjected to an electrical effect and underlies the ion conducting layer. The ion conductor is transparent in the visible range, preferably solid, with high electronic resistivity and high ionic conductivity. Lithium or hydrogen ion conductors are suitable and include lithium silicate, lithium aluminum silicate, lithium aluminum borate, lithium borate, lithium zirconium silicate, lithium niobate and various hydrogen or lithium conducting electrolytes. The counterelectrode can be nickel oxide, iridium oxide, vanadium pentoxide, molybdenum oxide, or combinations of these materials, such as chromium-vanadium oxide.

In a method of manufacturing an electrochromic device according to the invention, which can be relatively large-scale, a substrate is combined with a set of layers, including an ion conducting layer, and counterelectrode and electrochromic layers. At least one of the layers desirably is formed by chemical dip coating. The other layers also may be formed by dip coating, or by sputtering and/or thermal evaporation.

In a method of operating an electrochromic device, electrical energy is applied between exterior and interior transparent conductive layers. This causes a migration of ions among the counterelectrode, the ion conductor and the electrically responsive coloration layer. Exterior energy, such as light, ultraviolet and infrared radiation, is transmitted through a transparent substrate to the interior transparent conductive layer. The voltage controlled coloration determines the extent to which the exterior energy is further transmitted from the interior transparent conductive layer through the electrochromic layer, the ion conductor, the counterelectrode and out of the exterior transparent conductive layer.

Before completion of devices in accordance with the invention at least the electrochromic or counterelectrode layer is chemically reduced to provide the layer with at least an electron and a charge compensating ion, generally of lithium or hydrogen.

DESCRIPTION OF THE DRAWINGS

Other aspects of the invention will become apparent after considering several illustrative embodiments, taken in conjunction with the drawings in which.

DETAILED DESCRIPTION

Figure 1:
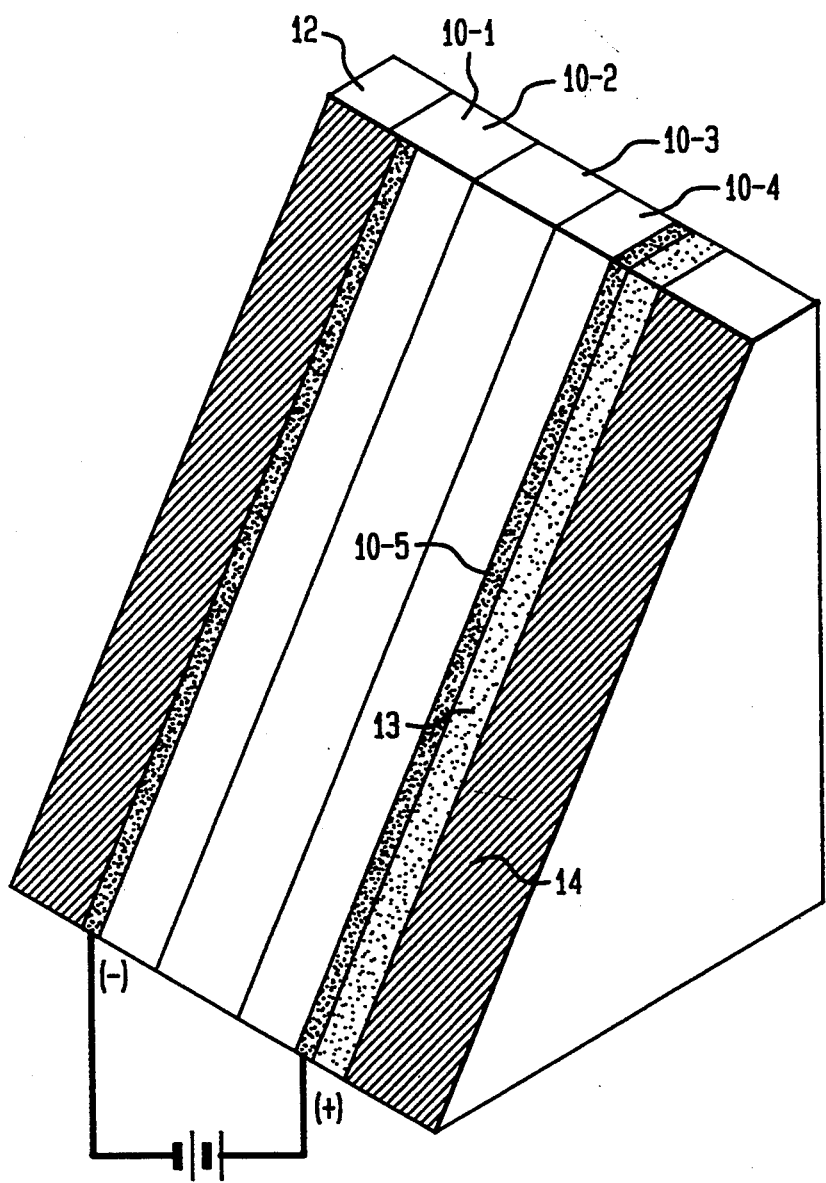
FIG. 1 is a perspective view of an electrochromic device structure with constituent layers in accordance with the invention.

With reference to the drawings a window 10 in accordance with the invention is shown in FIG. 1. The window 10 is electrochromic in the sense that the transparency of the area exposed to external illumination or radiation is controlled electrically or electronically. For that purpose the occupant of a room or compartment containing the skylight can operate electrical controls in the manner described in detail below in order to achieve a desired degree of darkness or lightness. It will be appreciated that although the invention is illustrated in terms of a skylight, it is equally applicable to windows in other areas that admit illumination into the interior of a room or compartment. Numerous other applications include mirrors, sunglasses, etc.

By virtue of the electrical control over transparency, a window, for example, can be completely darkened even during periods of evening darkness, as and when desired.

Figure 2:
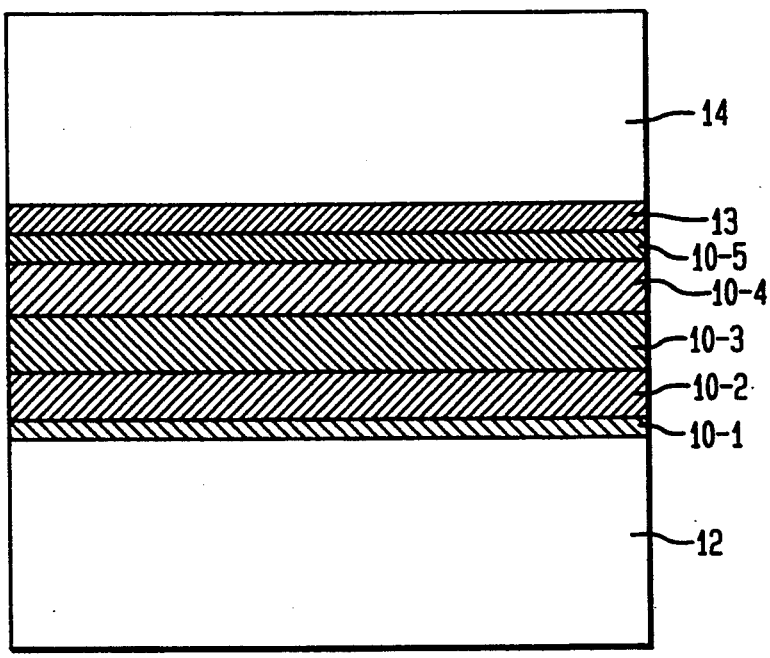
FIG. 2 is a view of a planar section of FIG. 1.

As shown in the cross-sectional view of FIG. 2, the window 10 of FIG. 1 includes a transparent conductor 10-1, an electrochromic layer 10-2, an ion conductor 10-3, a counterelectrode 10-4 and a second transparent conductor layer 10-5. Because of the way the section has been taken, only a planar portion has been shown, although in the general case the portion would be nonplanar.

The constituents 10-1 through 10-5 of FIG. 2 can be deposited using vapor deposition techniques on a substrate 14 and are adhered to the substrate 12 by a convenient medium 13, which can be a laminating transparent adhesive such as ethylene vinylacetate or polyvinylbutyral.

Alternatively, the constituents 10-1 through 10-5 may be deposited to the substrate 12 by a "sol-gel" dipping or spinning technique. The materials which are to form the various layers are dissolved in an organic solvent and reacted as desired, after which the solvent is evaporated to form a precipitate which is heated to realize the desired layer. In this way successive layers can be formed.

Layer 10-2 is an active electrochromic layer, illustratively of tungsten oxide ($WO_3$). The electro-chromic layer is an optically active which permits the reversible insertion and removal of guest species such as lithium or hydrogen atoms. The layer's ability to change its transparency and transmit light is a direct function of the number of lithium, hydrogen or other coloration atoms of the layer. While tungsten trioxide is a standard electrochromic layer, other suitable layers include niobium oxide, molybdenum trioxide, nickel oxide, iridium oxide, and solid solution mixtures of such oxides.

Overlying the electrochromic layer 10-2 is a transparent and electrically insulating ion conductor layer 10-3 which electrically isolates the electrochromic layer 10-2 from the counterelectrode layer 10-4. The ion conducting layer 10-3 allows ions, but not electrons, to pass through it and provide the device with "memory". There are many suitable ion conductor electrolytes, including lithium-based ceramics such as lithium silicate, lithium borosilicate, lithium aluminum silicate, lithium niobate, lithium nitride and lithium aluminum fluoride. Other suitable ion conductor electrolytes could be used, such as silicon dioxide for proton (hydrogen) based electrochromic devices.

The counterelectrode layer 10-4 "inserts" and stores ions and electrons when not employed in the electrochromic layer 10-2. Some counterelectrode materials are also electrochromatic in that they change their shade or transparency as ions move in and out. Such materials complement the coloration of the electrochromic layer 10-2. Suitable insertion compounds for the counterelectrode are vanadium pentoxide, niobium oxide, indium oxide, nickel oxide, cobalt oxide and molybdenum oxide, and mixtures of these oxides.

Figure 3:
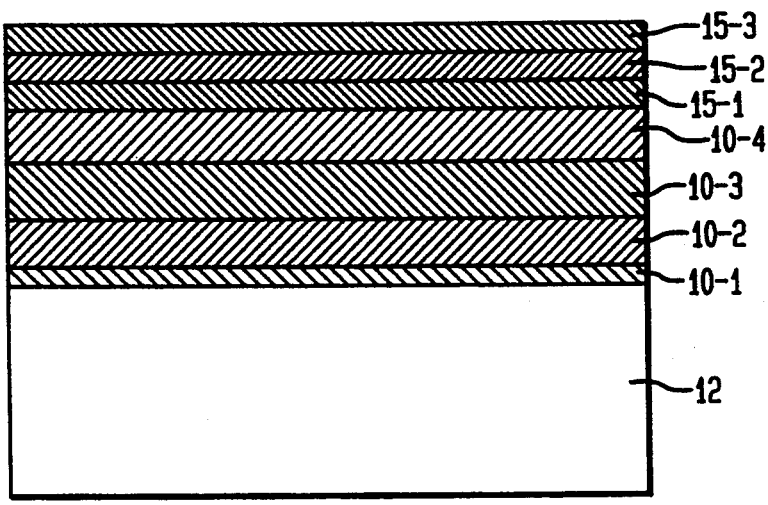
FIG. 3 is a schematic diagram of a layered index-matched structure incorporating an electrochromic device structure.

Prior to the completion of the window 10, at least one of the constituents 10-2 or 10-4 is inserted with a source of colorant atoms, for example, lithium or hydrogen, unless there is already a source of such atoms within one of the constitutents. FIG. 3 shows another version of the electrochromic device using a layered index-matched structure (LIMS) which contains the following layers deposited on a glass substrate 12: 10-1, 10-2, 10-3, 10-4, barrier layer of metal 15-1, e.g., copper, titanium, nickel, metal layer 15-2, e.g., silver, an oxide layer 15-3 such as indium tin oxide, zinc oxide, zinconium oxide.

General Techniques of the Invention

The invention makes use of a gel or colloidal reaction process to produce at least one layer of the foregoing product. Precursors for the process are metals or metalloid elements surrounded by ligand appendages without metallic or metalloid atoms.

The process starts with alkyl ligands formed by removing a hydrogen atom from alkane molecules. The removal provides a ligand electron for metal or metalloid bonding. Consequently, metal alkoxides are metal-organic compounds with an organic ligand attached to a metal or metalloid atom.

The alkoxide precursor is "alkoxy" when a hydrogen atom is removed from the hydroxyl group of an alcohol. A representative example is silicon tetraethoxide (STEO), also known as tetraethoxysilane and tetraethyl orthosilicate (TEOS), having the general formula Si-$(OC_2H_5)_4$. Metal-organic compounds are distinguished from organometallics which have direct metal-carbon bonds, as opposed to the metal-oxygen-carbon bonds in metal organics.

Metal organics react readily with solvents to hydrolyze, nitrolyze or carbolyze to attach hydroxyl, nitroxyl and carboxyl ions, respectively, to metal atoms. Suitable solvents are water and alcohols. The resultant alkoxy, alknitry and alkcarby groups are designated —OR, —NR, and —CR, respectively.

Depending on the amount of solvent and catalyst present, hydrolysis, and the related reactions, may go to completion with, in the case of hydrolysis, OR groups replaced by the hydroxyl ion OH.

In addition to metalorgano compounds, inorganic precursors also can be hydrolyzed.

When molecules are partially hydrolyzed, they link together in a condensation reaction that liberates a small-scale molecule, such as water or alcohol. The reaction can continue to build molecules of indefinite size. The condensation that takes place in a solution of metalorganic monomers results in a colloidal cross-link polymer known as a "sol".

Colloidal sols are particulate where non-polymeric solid particles are dispersed into a fluid. Particulate silica sols typically are formed in aqueous solutions. Polymeric silica sols, on the other hand, are obtained from the hydrolysis of alkoxides in non-aqueous solutions, which may have additional water. In general, a polymeric sol has a solid phase with colloidal oxide particles. Silica tends to form polymeric sols, but most other oxides form particulate sols.

In substantially non-aqueous systems, such as solutions of alkoxide-alcohol and water, the solubility of the solid phase is limited and the condensation reaction is essentially irreversible. When a molecule reaches macroscopic dimensions and extends throughout the solution, a gel point is reached when the last bond is formed to complete the molecule. The resulting gel has a continuous skeleton enveloping a continuous liquid phase. The continuity of the skeleton provides elasticity. A polymeric gel can be formed from particulate sols when attractive dispersion forces cause the particles to adhere and form a network.

In general, a gel is a two-phase semisolid that contains liquid in a fluid phase of colloidal dimensions. The type of bonding is not characteristic, since the bonds may be reversible or permanent, as in polymeric systems. When the gel process begins, fractal, i.e. particulate aggregates are formed that grow, impinge on one another and then link together by percolation. Near the gel point bonds form at random. Gelation after casting produces a monolith, while gelation after rapid evaporation of solvent produces films.

To avoid shrinkage, the wet gel is autoclaved and dried under supercritical conditions with no interface between liquid and vapor. The result is an "aerogel". Otherwise gel shrinkage can take place because of network deformation and transport of fluid through pores. Drying by evaporation produces capillary pressure that causes shrinkage and produces a "xerogel" i.e dry gel of reduced volume.

Both xerogels and aerogels have high porosity so that they are useful for catalytic substrates and filters. In addition, the dry gel has labile sites that permit other chemical reactions such as the chemisorption of ammonia.

While gels are generally amorphous, they may crystallize on heating at high temperatures by the collapse of pores. When amorphous gels are sufficiently heated, the transport of atoms is by viscous flow and the result is viscous sintering. In crystalline materials, the sintering is by relatively slow diffusion.

If the processing steps all are at relatively low temperatures, a densified gel has a unique structure with unique properties.

Sols and gels are of particular importance in the preparation of thin films.

In the sol-gel process of the invention, there are four typical stages. The first stage is the production of a solution of a mixture that can include one or more alkoxides, or equivalents, and/or metallic compounds. This is followed by the spin or dip coating of a thin film on a glass substrate. In the third stage there is simultaneous hydrolysis and drying. The final stage is heat treatment to eliminate solvents and water, and to promote condensation of the film. It also is possible to combine water with the alcohol and alkoxide precursor mixture, so that hydrolysis, condensation reactions start in the solution itself prior to dipping or spin coating.

Manufacture of Transparent Oxides

To manufacture transparent oxide layers 10-1 and 10-5, in accordance with the invention, an alkoxide, for example, tetraethoxy orthosilicate is dissolved in an organic solvent, such as the alkyl alcohol, methanol.

If the layer is to include a second component, for example lithium, a metallic lithium compound, or an alkoxide of lithium such as $LiOCH_3$, is added, and the solution is mixed and maintained at a suitable temperature, e.g. room temperature. After dipping the substrate in this solution, it is withdrawn at a constant rate in a controlled atmosphere.

The solvent is then evaporated in the presence of moisture to produce a hydrolyzed gel. In the final step, the gel is heated to convert it to a hardened glassy layer.

EXAMPLE I

Silicon alkoxide in the form of $Si(OC_2H_5)_4$, in the amount of 100 cubic centimeters of liquid, is placed in a container of 200 cubic centimeters of dry ethanol. If necessary the solution is diluted, and then coated upon the substrate with a controlled thickness, where evaporation occurs, leaving a residue which is heated at about 50 degrees C. per minute to below 500 degrees C. for about 20 minutes, and is then cooled at a similar rate, i.e., 50 degrees C. per minute. The result is a clear, hardened and transparent layer.

Manufacture of Electrochromic Layers

To manufacture the electrochromic layer 10-2, a metal alkoxide, for example, tungsten or molybdenum alkoxide, is dissolved in an organic solvent, e.g. alcohol.

The solvent is then evaporated in the presence of moisture to produce a hydrolyzed gel. In the final step, the gel is heated to convert it to a hardened layer, illustratively tungsten oxide ($WO_3$).

EXAMPLE II

Example I is repeated with a tungsten alkoxide, such as tungsten ethoxide $W(OC_2H_5)_5$ in place of tetraethoxy orthosilicate (TEOS), and the result is a clear, hardened and transparent layer of tungsten oxide ($WO_3$).

Manufacture of an Ion Conductor

To manufacture an ion conductor 10-3, a metal alkoxide, nitrate, or halide, for example, a lithium alkoxide, such as lithium methoxide; lithium nitrate ($LiNO_3$), or lithium chloride (LiCl) is dissolved in an organic solvent to which is added TEOS.

Since the layer is to include a second component, for example silicon or aluminum, a metallic compound of silicon or aluminum is added, and the solution is maintained at a suitable temperature.

After dipping, the solvent is then evaporated in the presence of moisture to produce a hydrolyzed gel.

In the final step, the gel is heated to convert it to a hardened layer of lithium silicate, lithium nitride or lithium aluminum chloride.

Manufacture of a Counterelectrode

To manufacture a counterelectrode layer for the constituent 10-3, a metal alkoxide, for example, of vanadium or vanadium/chromium alloy, is dissolved in an organic solvent. Alternatively, a mixture of alkoxides, for example vanadium and niobium, or vanadium and chromium, alkoxides, may be used.

EXAMPLE III

Example I is repeated with lithium tetramethyl oxide $Li(OCH_3)_4$ in place of silicon tetramethyl oxide, and the result is a clear, hardened and transparent layer of $WO_3$.

After formation of the solution, the solvent is then evaporated in the presence of moisture to produce a hydrolyzed gel.

In the final step, the gel is heated to convert it to a hardened layer of vanadium/chromium oxide.

Another example is the use of a mixture of vanadium triisopropoxide oxide and chromium isopropoxide dissolved in methanol. The substrate is dip-coated in this solution at a controlled rate in a controlled atmosphere.

In general, the manufacturing process in accordance with the invention involves the following steps:
1. Preparing a solution of a metal alkoxide and/or a metallic compound dissolved in a solvent;
2. Dip coating a surface to be coated into the solution by removing the surface from the solution at a controlled rate to get a controlled thickness of layer coating;
3. Placing the removed coated surface in a controlled humidity environment so that hydrolysis (with water insertion), and a condensation reaction (solvent, e.g., alcohol, removal) take place simultaneously; and
4. Controllably heating the hydrolyzed and condensed coated surface.

The foregoing description is illustrative only, and other uses, adaptations and features of the invention will be apparent to those of ordinary skill in the art.

What is claimed:

1. An electrochromic device applied to a substrate comprising an electrochromic layer, a counterelectrode layer, and a ion-conducting layer therebetween, said ion-conducting layer comprising a lithium based ceramic material containing residual organic impurities prepared from the dissolution of at least one metallic organo compound in an organic solvent, and gelation of said metallic organo compound.

2. The electrochromic device of claim 1 wherein said metallic organo compound comprises a metal alkoxide.

3. The electrochromic device of claim 2 wherein said metal alkoxide comprises an lithium alkoxide.

4. The electrochromic device of claim 2 wherein said metal alkoxide comprises a silicon alkoxide.

5. The electrochromic device of claim 1 wherein said organic solvent comprises an alcohol.

6. The electrochromic device of claim 1 wherein at least one of said electrochromic layer and said counterelectrode layer is chemically reduced with a source of charge compensating ions, said charge compensating ions comprising the ions to be conducted by said ion-conducting layer.

7. The electrochromic device of claim 1 wherein at least one of said electrochromic layer and said counterelectrode layer is produced by dissolution of at least one metallic organo compound in a solvent.

8. The electrochromic device of claim 1 wherein said lithium-based ceramic material is selected from the group consisting of lithium silicate, lithium borosilicate, lithium aluminum silicate, lithium niobate, lithium nitride, and lithium aluminum fluoride.

9. The electrochromic device of claim 1 wherein said substrate comprises glass.

10. The electrochromic device of claim 1 wherein said electrochromic layer is selected from the group consisting of tungsten oxide, niobium oxide, molybdenum oxide, nickel oxide, iridium oxide, and mixtures thereof.

11. The electrochromic device of claim 10 wherein said electrochromic layer comprises tungsten oxide.

12. The electrochromic device of claim 1 wherein said counterelectrode layer is selected from the group consisting of vanadium pentoxide, niobium oxide, indium oxide, nickel oxide, cobalt oxide, molybdenum oxide, and mixtures thereof.

13. The electrochromic device of claim 12 wherein said counterelectrode layer comprises vanadium pentoxide.

14. The electrochromic device of claim 1 including first and second transparent conductive layers in contact with said electrochromic layer and said counterelectrode layer, respectively.

15. The electrochromic device of claim 1 including heating said ion-conducting layer subsequent to said gelation step.

16. An electrochromic device applied to a substrate comprising an electrochromic layer, a counterelectrode layer, and an ion-conducting layer therebetween, at least one of said electrochromic layers and said counterelectrode layer being chemically reduced with a source of electrons and charge compensating ions comprising the ions to be conducted by said ion-conducting layer, said ion-conducting layer comprising a lithium based ceramic material containing residual organic material prepared from the dissolution of at least one metallic organo compound in an organic solvent, and gelation of said metallic organo compound.

17. The electrochromic device of claim 16 wherein said metallic organo compound comprises a metal alkoxide.

18. The electrochromic device of claim 17 wherein said metal alkoxide comprises an alkali metal alkoxide.

19. The electrochromic device of claim 16 wherein said organic solvent comprises an alcohol.

20. The electrochromic device of claim 16 wherein said lithium-based ceramic material is selected from the group consisting of lithium silicate, lithium borosilicate, lithium aluminum silicate, lithium niobate, lithium nitride, and lithium aluminum fluoride.

21. The electrochromic device of claim 16 wherein said substrate comprises glass.

22. The electrochromic device of claim 16 including first and second transparent conductive layers in contact with said electrochromic layer and said counterelectrode layer, respectively.

23. The electrochromic device of claim 16 including heating said ion-conducting layer subsequent to said gelation step.

* * * * *

UNITED STATES PATENT AND TRADEMARK OFFICE
CERTIFICATE OF CORRECTION

PATENT NO. : 5,404,244
DATED : April 4, 1995
INVENTOR(S) : John E. Van Dine, V. D. Parkhe, Lisa C. Klein, Forrest A. Trumbore It is certified that error appears in the above-identified patent and that said Letters Patent is hereby corrected as shown below:

Column 8, line 50, delete "an alkali metal" and insert therefor --a lithium--.

Signed and Sealed this

Fifteenth Day of August, 1995

Attest:

BRUCE LEHMAN

Attesting Officer

Commissioner of Patents and Trademarks